United States Patent [19]
Twigg et al.

[11] Patent Number: 5,646,349
[45] Date of Patent: Jul. 8, 1997

[54] FLOATING MASS ACCELEROMETER

[75] Inventors: Robert David Twigg, Seattle; Jeffrey Curtin Spengler, Bellevue, both of Wash.

[73] Assignee: Plan B Enterprises, Inc., Medina, Wash.

[21] Appl. No.: 488,975

[22] Filed: Jun. 8, 1995

Related U.S. Application Data

[63] Continuation-in-part of Ser. No. 198,867, Feb. 18, 1994, Pat. No. 5,524,489.

[51] Int. Cl.$^6$ .................................................. G01P 15/08
[52] U.S. Cl. ........................... 73/514.38; 73/514.35
[58] Field of Search ........................ 73/514.26, 514.01, 73/514.35, 493, 514.38; 340/669, 467; 200/61.45 R, 61.53

[56] References Cited

U.S. PATENT DOCUMENTS

| | | | |
|---|---|---|---|
| 3,789,674 | 2/1974 | Anderson | 73/514.26 |
| 4,083,254 | 4/1978 | Nissl | 73/514.26 |
| 4,226,120 | 10/1980 | Nissal | 73/514.26 |
| 4,819,486 | 4/1989 | Kunkel | 73/514.26 |
| 4,822,999 | 4/1989 | Parr | 73/514.26 |
| 5,063,781 | 11/1991 | Conforti | 73/514.26 |

*Primary Examiner*—Christine K. Oda
*Attorney, Agent, or Firm*—Stephen M. Evans

[57] ABSTRACT

A floating mass accelerometer having at least one elastic member contacting a mass that is supported by a low friction surface is disclosed. At least one proximity sensor is located adjacent the mass and provide an output based upon the distance between the sensor and the mass as regulated by the degree of elastic member flexion. Acceleration forces acting upon the mass cause the mass to move in response thereto, thereby causing deflection of the at least one elastic member. The change in distance between the mass and the at least one proximity sensor is relayed to a digital signal processor which processes the acceleration information and sends this information to a display and/or memory unit. In a preferred embodiment, a two axis accelerometer is disclosed wherein acceleration values greater than a predetermined level are stored in memory and may be recalled later to provide an indication as to acceleration forces encountered by the device. Alternative embodiments provide for an pre-impact monitor wherein a buffer holds acceleration information for the last time period; a shipping monitor wherein acceleration forces are time-tagged for later retrieval; a seismic monitor with an optional output relay capable of remote operations.

20 Claims, 12 Drawing Sheets

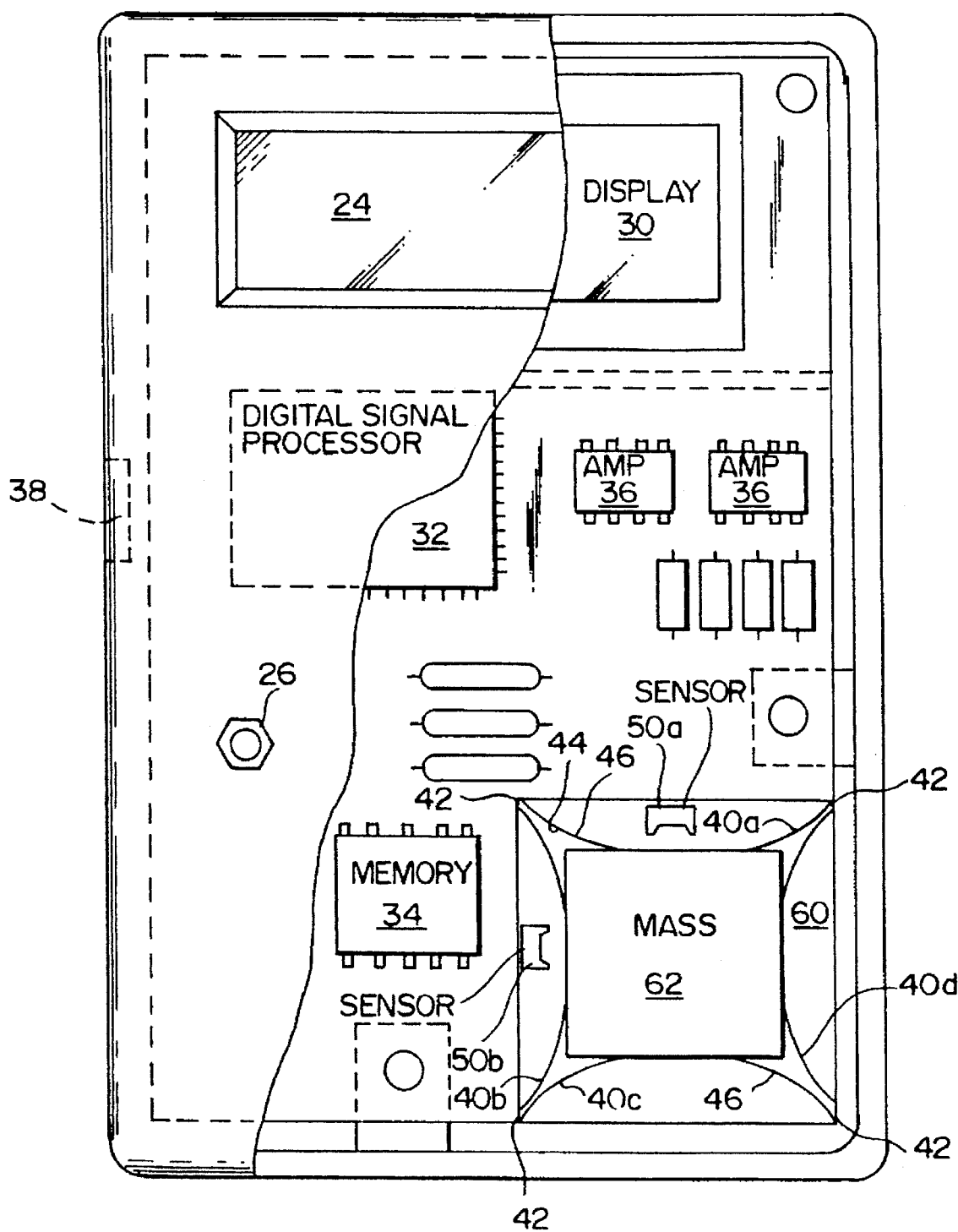

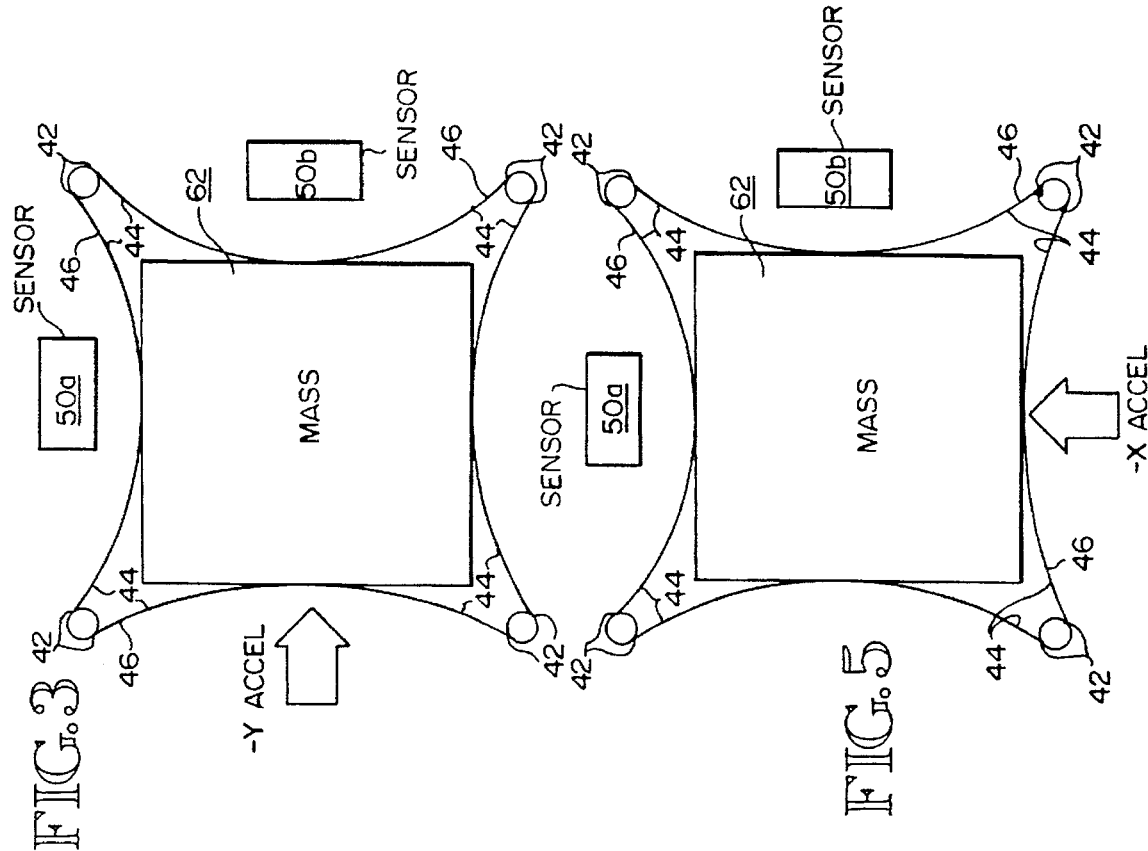
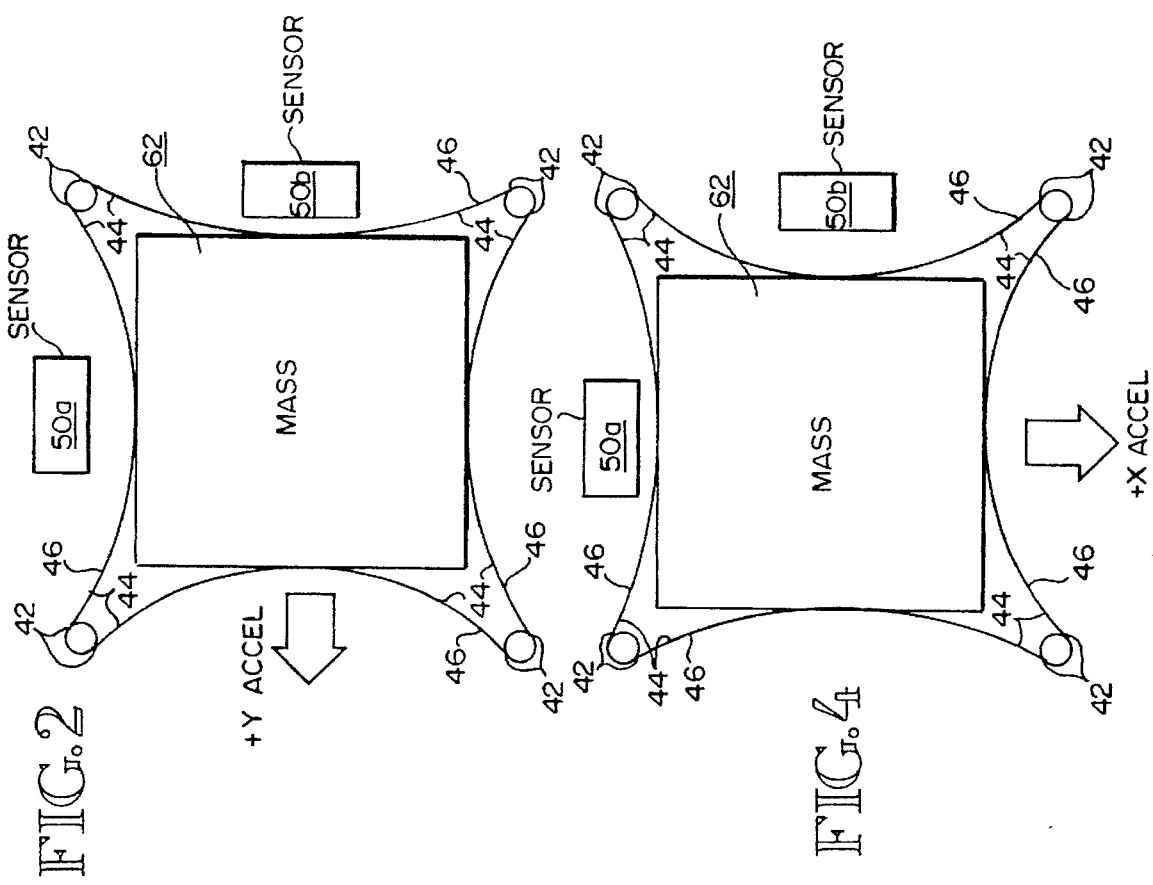

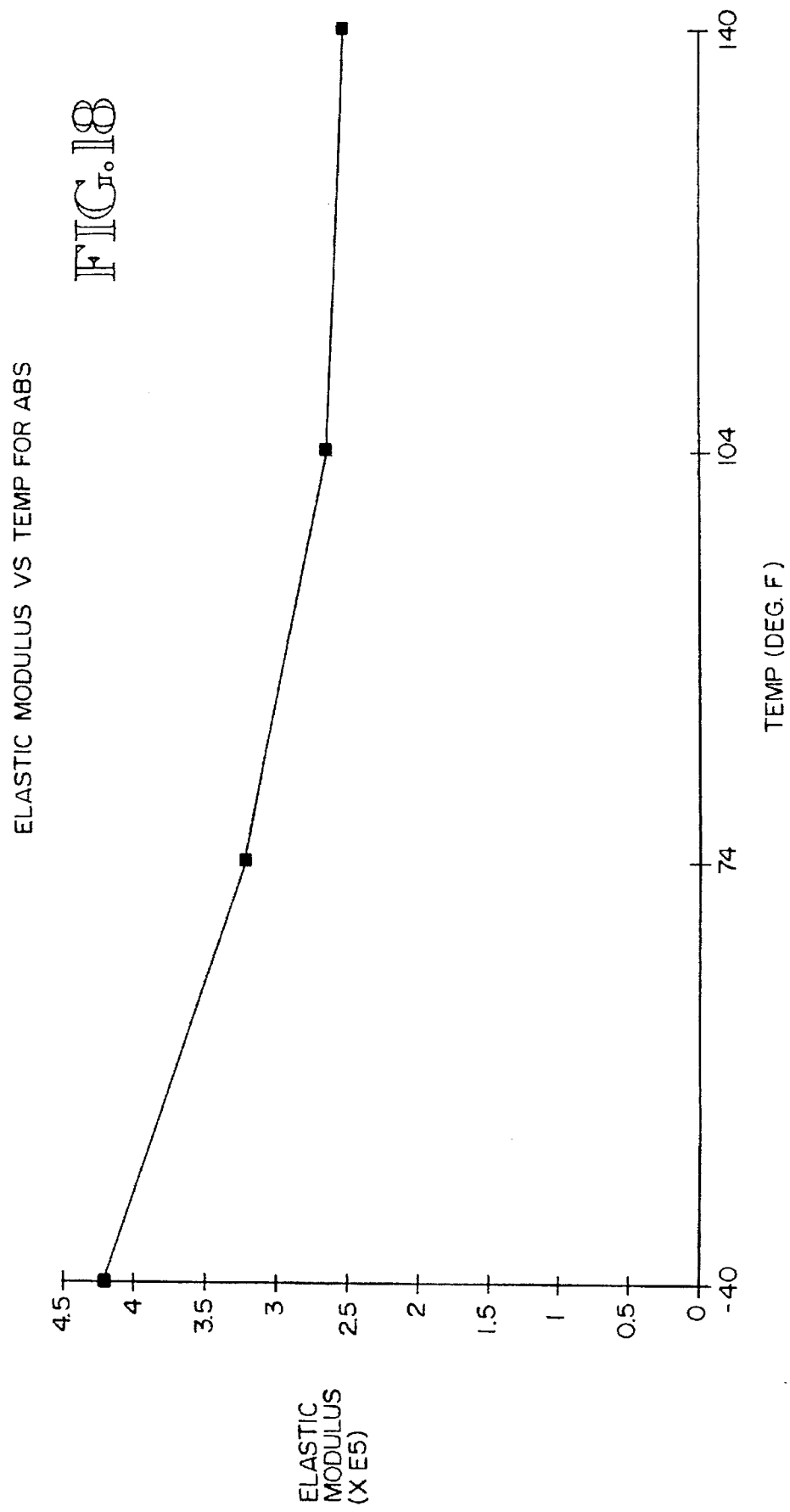

FLOATING MASS ACCELEROMETER

This application is a continuation-in-part of patent application Ser. No. 08/198,867, filed on Feb. 18, 1994 and has issued as U.S. Pat. No. 5,524,489.

FIELD OF THE INVENTION

The present invention relates to the field of measuring instruments and more particularly to the field of opti-mechanical accelerometers.

BACKGROUND OF THE INVENTION

Instruments designed to measure acceleration of an object have been known and in use for many years. Some acceleration monitors measure an object's acceleration from a distance, i.e. the instruments are not in the same frame of reference as the object itself. Examples of these instruments include doppler type devices that measure the change in frequency per unit time of an emitted EM wave compared to the wave after having been reflected by the object, and frequency analyzers that measure the shift in frequency per unit time of an EM wave emitted by the object. Other devices do not rely on taking the derivative of the velocity (the change in velocity per unit time) but instead directly measure the resulting effect of acceleration on a body in the same frame of reference as the object. It is this method of measurement to which the present invention pertains.

SUMMARY OF THE INVENTION

In basic form, the present invention comprises a mass located on a surface wherein the mass and surface have a very low coefficient of friction therebetween. The mass assumes a first location thereon in the absence of acceleration forces not normal to the supporting surface. A bias means is provided for resisting movement of the mass and returning the mass to the first location after the mass has been subject to an acceleration force. Thus, the mass is elastically maintained at the first location. The bias means comprises physical elastic members such as springs in the form of leaf springs, coil springs, torsion elements, tangs or the like constructed from any metallic material, non-metallic material, or combinations thereof capable of deforming and returning substantially to its original shape or configuration after application of a force thereto. The bias means may be in contact with the mass, or attached thereto as the case may be. Alternatively, magnetic forces generated by permanent or electromagnets can be applied to the mass to create the desired bias. At least one proximity sensor is positioned proximate to the mass to provide output information relating to the relative distance between it and the mass.

In one embodiment, the mass is in compressive tangential contact with a first curved elastic member having a spring constant associated therewith. Preferably, the point of tangential contact is at the apex of the curve. An imaginary line drawn from the point of compressive tangential contact of the first elastic member to the center of mass of the mass should be parallel to the axis of acceleration to be measured. Along this imaginary line is located a first proximity sensor. The first proximity sensor detects the distance between it and the mass to provide an electromagnetic output generally proportional thereto. While this imaginary line should correspond to the direction of acceleration to be monitored, such an alignment is not necessary if the angle between the imaginary line and the vector of acceleration to be monitored is known and taken into consideration.

To minimize the effect that off-axis acceleration forces may have, low friction, off-axis prevention means are provided to retain the mass so that only movement of the mass in one direction (either arbitrary positive or arbitrary negative) is generally permitted. To ensure substantially linear response to mass movement, and to provide the option of measuring deceleration along the same axis as acceleration, a second, elastic member is placed in contact with the mass to provide a bias that urges the mass towards the first elastic member. Both elastic members are under a slight compressive load to insure that the first elastic member will extend or deflect in response to movement of the mass away from or towards it without losing contact with the mass.

A more complex embodiment of the present invention provides for measurement of acceleration in two axes by replacing one or both of the off-axis prevention means with a third and/or fourth elastic member, at least one member being in compressive tangential contact with the mass and having a second proximity sensor associated therewith. Similarly, measurement of acceleration and deceleration in three axes is possible by modifying the two axis accelerometer so that the mass is entirely supported by elastic members, again one of which being in compressive tangential contact with the mass and having a third proximity sensor associated therewith.

To increase the utility of the invention and to provide a greater scope of applications, the output of a proximity sensor can be directed to a signal processor and preferably a Digital Signal Processor (DSP). The DSP can then perform desired processing tasks and direct output to a memory device, a display, a signaling means, and/or a communications port. The functioning of the DSP can be controlled by real time external inputs such as switches or the like, or by internal soft/firmware.

The elastic members need only to have a known spring constant; any type of appropriate material having this property can be used with knowledge of the anticipated accelerations to be measured. Examples of elastic member materials include, but are not limited to, steel, spring steel stainless steel, natural or man-made polymers, or combinations thereof. The one or more proximity sensors include, but are not limited to, optical, magnetic (Hall Effect), resistive, capacitive, or physically compressive (piezoelectric) based sensors. The mass may be constructed from any suitable material including conductive elements or compounds such as iron, steel, copper, or aluminum, or nonconductive elements or compounds such as plastic polymers, or combinations of the two, e.g., copper core with a polymer coating or shell. Similar parameters apply with regard to magnetic properties. In most applications, however, it is desirable to utilize a dense and incompressible mass.

To reduce the effects of static friction between the mass and either the elastic members or the prevention means, friction reducing coatings may be applied to expected areas of contact, the materials themselves may be chosen to have such properties, or additional structure such as micro ball bearings, fluid suspension, or the like may be incorporated. In any event, it is desirable to reduce the effects of static friction or "stiction" so as to increase the linearity of acceleration measurement. In a preferred embodiment, a Teflon® coating is applied to the mass, the support surface, and the inboard surfaces of the elastic members so as to reduce the coefficient of static friction ($\mu_s$) to about 0.04. It should be noted that by treating the mass with a Teflon® coating, the mass is no longer conductive.

In yet another embodiment, the mass is elastically captive relative to the surface through the use of a single elastic member acting as an elastic tether between the mass and a rigid, non-moving member to provide a two axis accelerometer without the need for a second elastic member or off-axis prevention means. The single elastic member is oriented normal to a plane of acceleration, e.g., if x axis and/or y axis accelerations components are to be measured, the elastic member has principal rigidity in the z axis. Consequently, the restoring bias provided by the single elastic member is omnidirectional within the plane.

The elastic member may be fixedly or removably attached to the mass and/or to the rigid, non-moving member—it is only necessary that the elastic member provide a known, predictable restoring bias to the mass upon its acceleration in the directions that are to be monitored. The elastic member may extend from the mass and be receivable by a rigid member; or the elastic member may extend from the rigid member and be locatable in or on the mass. In either embodiment, the mass remains elasticly associated with the rigid member. The rigid member may be the support surface, or any portion of the invention that is in the same frame of reference as the invention. The composition of the elastic member and the mass have the same parameters as those set forth above for previous embodiments.

In preferred form, the elastic member is a conical tang or shank that extends from the housing and depends into a bore located at the mass' center of mass. By slightly oversizing the bore (both in circumference and in depth), the mass will not bind on the tang because of, for example, differences in thermal expansion rates between the mass and the tang.

Output from the floating mass accelerometer can be processed by the DSP to provide an instantaneous output that may either be visual, audible, or both. In various embodiments, only accelerometer output correlating to critical accelerations will be subject to memory or audible/visual observations. Further embodiments utilize the accelerometer output to control external devices such as relays via a communications port. The basic structure as well as the invention's various embodiments will be discussed in more detail below.

BRIEF DESCRIPTION OF THE DRAWINGS

FIG. 1 shows a plan view in partial cutaway of a preferred embodiment of a two axis accelerometer having a mass located on a low friction supporting surface and in compressive tangential contact with four curved elastic members with one proximity detector for each axis;

FIG. 2 shows the mass of FIG. 1 undergoing acceleration in the Y axis;

FIG. 3 shows the mass of FIG. 1 undergoing deceleration in the Y axis;

FIG. 4 shows the mass of FIG. 1 undergoing acceleration in the X axis;

FIG. 5 shows the mass of FIG. 1 undergoing deceleration in the X axis;

FIG. 18 shows a plot of the modulus of elasticity of an ABS tang vs. temperature;

DETAILED DESCRIPTION OF THE INVENTION

Figure 6:
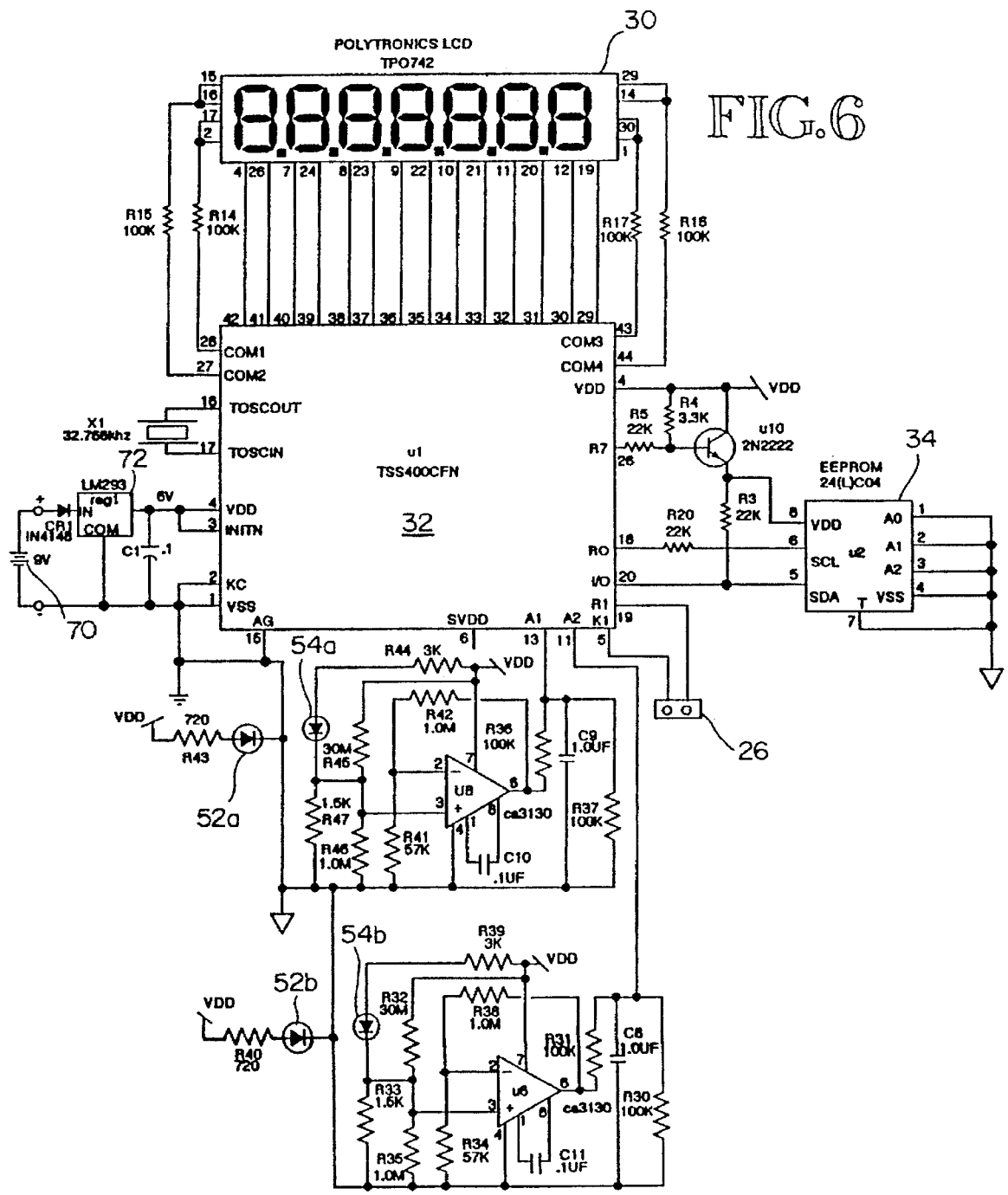
FIG. 6 is a schematic diagram of the electrical circuitry used for a two axis accelerometer.

Reference is now made to the several figures wherein like numerals indicate like parts and more specifically to a two axis embodiment of the invention as illustrated in FIG. 1 wherein the basic components are shown. A low friction, generally planar supporting surface 60 is surrounded by four curved elastic members or springs 40a–d (generically referred to as spring 40), with the ends generally referred to as 42 being fixedly attached to housing base 20. Each spring 40 has an operating range wherein the spring constant associated therewith is in fact constant so as to provide linear deflection in response to a constant acceleration force.

Located on surface 60 and within the confines of members 40a–d is mass 62. Mass 62 is sized and located so as to cause approximately 20–50% deflection of each member 40a–d within their operating range. In this manner, mass 62 is subject to compression forces from all springs 40, and can move in response to acceleration forces while still remaining in contact with each member 40. In a preferred embodiment, surface 60, mass 62, and inboard surfaces 44a–d of springs 40a–d are treated with a Teflon® coating to virtually eliminate relevant static friction or "stiction." It is to be understood that other types of stiction preventing coatings or treatments can be used and include oils, lubricants, bearings, vacuum, or air flow. By providing for a generally linear contact surface on mass 62, translation of mass 62 relative to any member 40 will not change the point of compressive tangential contact, thus ensuring that no matter what portion of mass 62 is in contact with a member 40, member 40 will continue to deflect predictably in response to acceleration forces causing movement of mass 62.

The invention further comprises a first and a second proximity sensor identified as sensors 50a and 50b. Sensor 50a is located adjacent to outboard surface 46a of member 40a and sensor 50b is located adjacent to outboard surface 46b of member 40b, it being understood that locating sensors 50a and 50b at any two adjacent sides is acceptable.

The sensitivity of the invention to changes in velocity (i.e. acceleration) can be modified by changing the spring constant of members 40a–d and/or changing the mass of mass 62. The spring constant of members 40a–d can be changed by altering the thickness or width of the member, or by changing its intrinsic properties such as its chemical composition. The spring constant may also be changed by increasing or decreasing the curvature of the spring. The choice of material for mass 62 is a design consideration and should be factored into any consideration of spring constants as it relates to sensitivity.

In a preferred embodiment of the invention, stainless steel or copper impregnated mylar strips of material are used. The strips measure approximately 1.05" by 0.163" and have a sectional thickness of approximately 0.002". Mass 62 consists of a generally square prism (0.72 inch$^2$ by 0.125 inch thick). While the shape of mass 62 does not have to be square, any shape chosen should provide only tangential contact with springs 40a–d so as to cause deflection thereof. Consequently, a mass having a complementary concave curve that was in contact with any member 40 would not cause the member to deflect as the member would behave similarly to a rigid arch and resist deflection. Furthermore, to avoid non-linear, off-axis output, the center of mass of mass 62 should be co-linear linear with the tangential contacts of members 40.

The described embodiment relies on acceleration forces on mass 62 to compress each member 40 to thereby provide a physical response, i.e. deflection of a member 40, that is monitored by a proximity sensor 50. Success has been found using an optical proximity sensor (Siemans SFH900-3) which provides precise voltage output changes in response to changes in proximity of a member 40. Each sensor 50 has an emitter 52 and a receiver 54. Light from emitter 52 is reflected by an spring 40 and received by receiver 54. The level of intensity of received light is inversely proportional to the square of the distance between sensor 50 and member 40. However, other proximity sensing means can be used. For example, a source of magnetic flux may be located on outboard surface 46 of a member 40 and Hall Effect sensors may then be located approximately in the position occupied by sensors 50. Another example includes the use of a strain gauge attached to a member 40. In each of these embodiments, the sensors provide usable output in proportion to sensor-to-member distance. Mass and member attributes are then chosen so as to use only the linear response output of any sensor/member combination.

FIGS. 2, 3, 4, and 5 illustrate a response by mass 62 when subject to acceleration forces as indicated. Attention is drawn to the fact that each member 40 remains in compressive, substantially tangential contact with mass 62 regardless of presented acceleration forces, thus ensuring substantially linear deflection by each member 40.

In order to process and meaningfully present the output signals generated by sensors 50a and 50b, digital signal processor (DSP) 32, display 30, and memory 34 are used which are best shown in FIGS. 1 and 6. DSP 32 is preferably a Texas Instruments TSS400 sensor signal processor although any DSP can be used. More information on this processor can be found in T1 product bulletin number SLM001. Display 30 is a conventional LCD display such as manufactured by Polytronics as model number TPO742. Because DSP 32 has a built-in LCD driver, no additional display driver is needed. Memory 34 is a conventional Electrically Erasable Programmable Read Only Memory (EEPROM) device such as a 24C04. Up to 64K of external EEPROM can be supported by the TSS400 processor. In the present embodiment, a 512 byte unit is used.

An electrical schematic of a two axis accelerometer according to the principles of the invention is shown in FIG. 6. A nine volt battery 70 supplies the necessary voltage to the components via voltage regulator 72. The distance between outboard surface 46 of springs 40a and 40b and proximity sensors 50a and 50b is proportional to the output voltage of each sensor 50 (see FIG. 1). This variable output voltage generated by sensors 50 in response to changes in the distance between a member 40 and a sensor 50 and filtered by C9, C8 is then amplified by CA3130 type amplifiers and directed to processor 32 inputs—A1 for x axis signals and A2 for y axis signals. Depending upon the programming of processor 32, output may be directed to digital display 30 and/or memory 34.

Operation

Figure 7:
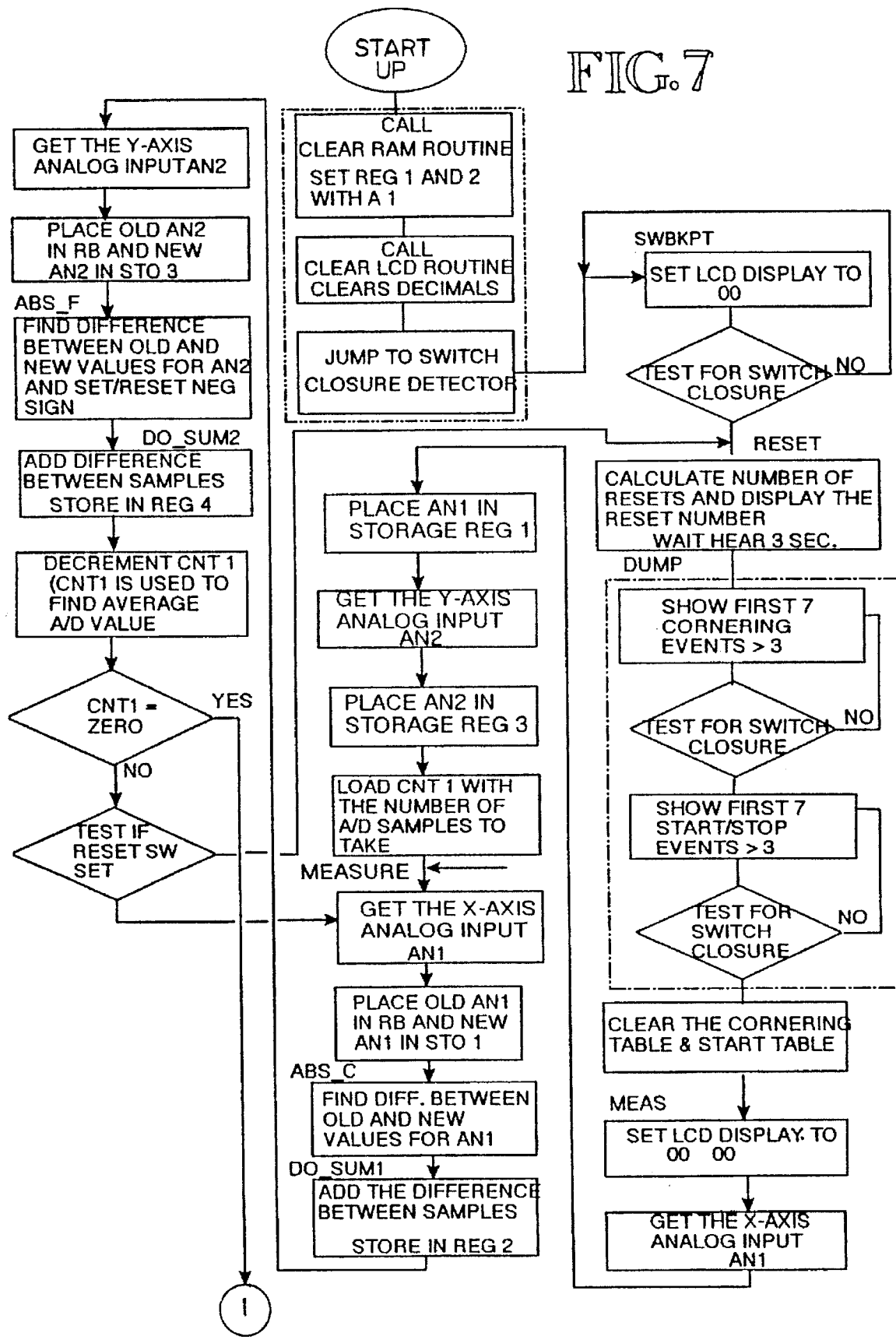
FIGS. 7, 8 and 9 show a flow diagram of the processing functions for the two axis accelerometer circuitry shown in FIG. 6.
Figure 8:
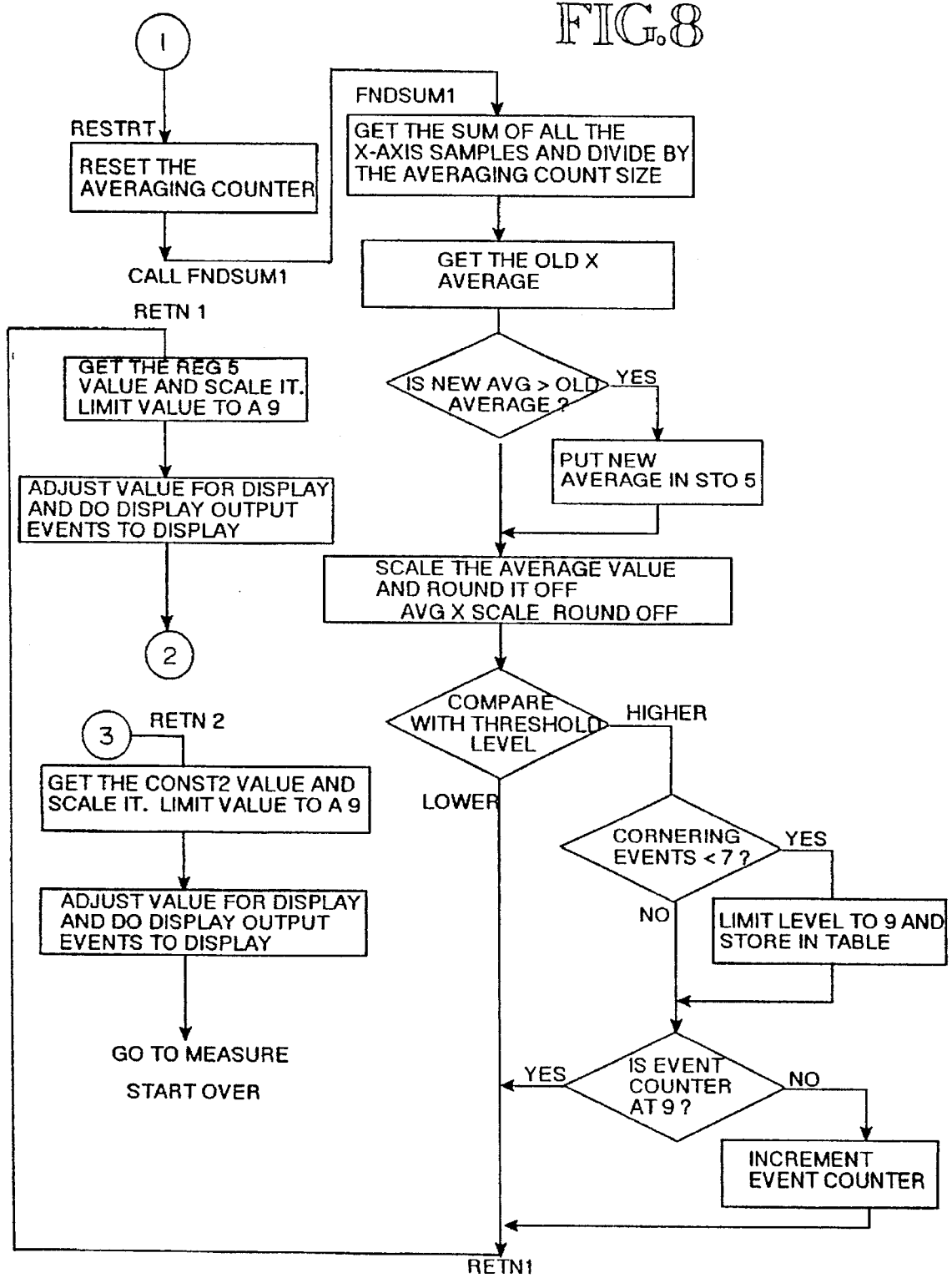
Figure 9:
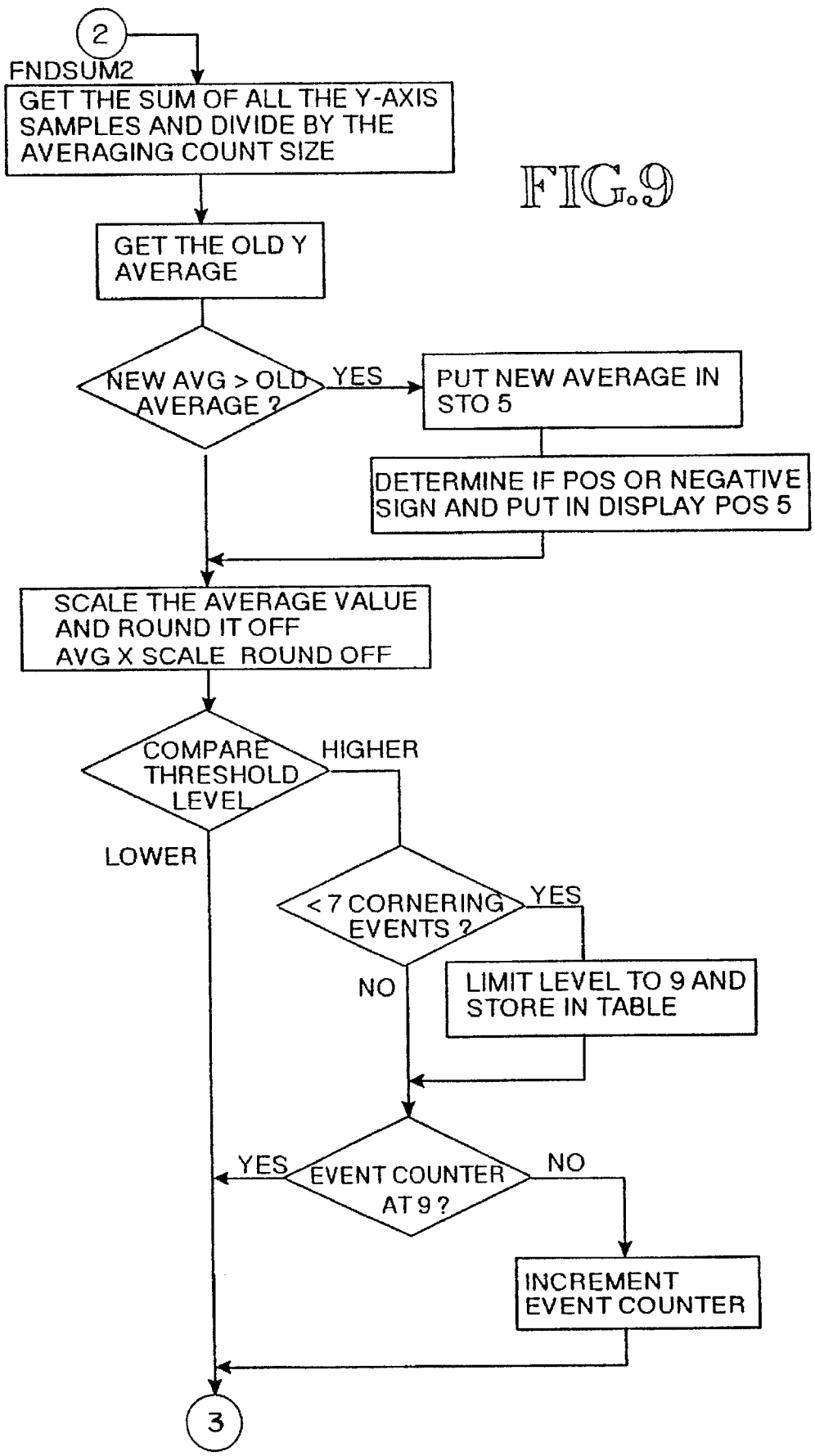

A flow diagram of the logic operations of processor 32 is shown in FIGS. 7, 8, and 9. When interpreted in view of FIG. 6, those persons skilled in the art should understand the processing logic of processor 32. Briefly stated, upon powerup of the device, the startup routine is initiated and a check is made to see if switch 26 has been momentarily closed. If so closed, DSP 32 then calculates the number of device resets and displays the restilts for approximately three seconds and then shows the first 7 x axis accelerations having a value greater than three via display unit 30 until switch 26 is again momentarily closed at which time the first 7 y axis accelerations having a value greater than three will be displayed. Upon subsequent momentary closure of switch 26, both the data for x axis accelerations and y axis accelerations will be cleared and display 30 will show "00 00."

A value for x axis acceleration will be retrieved and stored into temporary memory first at register 1, and then a value for y axis acceleration will be retrieved and stored into temporary memory at register 3. A counter 1 is next loaded with the number of samples of acceleration to be taken. A new value for x and y axis accelerations is obtained and the two values for x axis acceleration are compared wherein the difference between the two values is added to register 2. The same process then occurs for y axis acceleration with the difference being added to register 4. Upon completion of this process loop, the counter value is decreased by one and the process is repeated until the counter value is zero.

After completing the predetermined number of loops as set by counter 1, the averaging counter is reset to zero and the sum of all x axis samples are divided by the number of samples to yield the average value of x acceleration. If the average of the new accelerations in the x axis are greater than any old x acceleration value, then the new value is stored in storage register 5 and the value is scaled, rounded, and then compared to a threshold level (for example any level greater than three). If the scaled value is equal to or greater than the threshold value, then the value is stored in memory 34, the event counter is increased by one, and the value is displayed on display 30. The same process is repeated with respect to y axis accelerations. If the event counter has exceeded a predetermined value of 9, then the value is displayed and y axis acceleration is processed, but the value is not stored to memory 34. After completing similar processing of y axis acceleration, the measurement processes is repeated. These operations continue until the unit is powered down.

Figure 14:
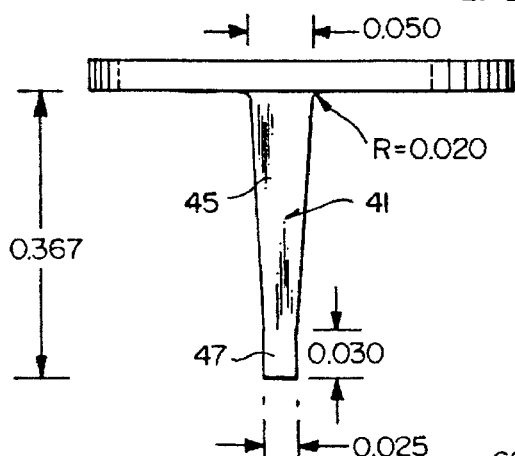
FIG. 14 is an elevation view of a tang embodiment of the elastic member wherein acceleration forces in two axis can be monitored.

The leaf type spring embodiments previously shown are not exclusive of the type of elastic members that can be utilized. As best shown in FIGS. 14 and 15, a unitary elastic member in the form of shank or tang 41 is located in primary recess or bore 68 of mass 62'. In this manner, mass 62' will predictably respond to accelerations encountered in the plane coincident to supporting surface 60. And because of this geometric configuration, there is no need to have off axis prevention means or opposing restoring elements.

Particular success has been had using the previously described supporting surface with a mass formed from a beryllium copper composition. As shown best in FIG. 15, mass 62' is preferably a cylindrical disk with a diameter of 0.625 inch and a height of 0.250 inch. Its weight is approximately 0.023 pounds. Mass 62' preferably has centrally located primary bore 68 and secondary locating bore 69 coaxially machined therein, wherein secondary locating bore 69 is formed to a size about 0.002 to 0.004 inch greater than complimentary portion 47 of tang 41. When using the described mass, tang 41 has a frusto conical cross section portion 45 at its proximal end where the root diameter is 0.050 inch and cylindrical cross section portion 47 at its distal end where the diameter is 0.025 inch; portion 47 is intended to depend into locating bore 69 which preferable extends into mass 62' slightly beyond the tip of portion 47. A 0.020 inch root radius reduces and/or eliminates stress concentration at the interface between portion 47 of tang 41 and the rigid member which would normally exist without providing for such a radius. For simplicity and ease of manufacture, tang 41 is of an injection molding construction and is composed of a polymeric plastic such as ABS. To modify the elasticity and spring constant of the tang, it may be desirable to form a composite tang such as by locating a spring steel insert coaxially therein.

Figure 15A:
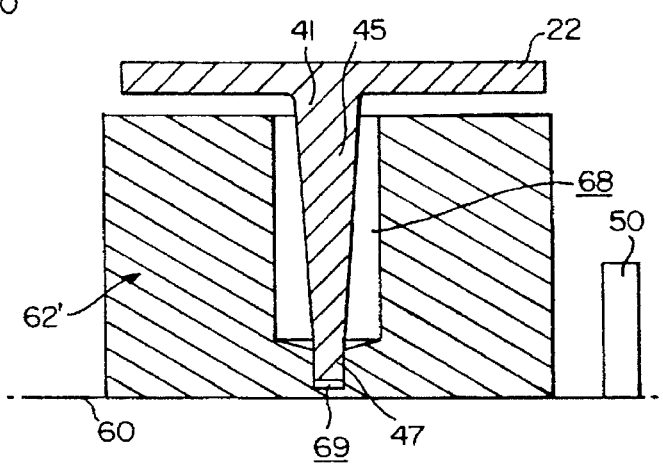
FIG. 15a is an elevation view similar to FIG. 14 but also shows the location of and interaction between the tang and the mass.

In FIG. 15a, tang 41 is shown as being integral with housing cover 22. By incorporating tang 41 with housing cover 22, manufacturing and assembly procedures are greatly simplified and costs are greatly reduced compared to the previously disclosed embodiments. The ABS plastic tang and copper beryllium mass, having the dimensions referred to above, permit mass 62' to move laterally about 0.0167 inch when subjected to a lateral acceleration force of 1 g at an ambient temperature of 74° F. The modulus of elasticity, as a function of temperature is shown in FIG. 18, and can be used to compensate for temperature induced variances in the deflection distance experienced by the mass.

Figure 15B:
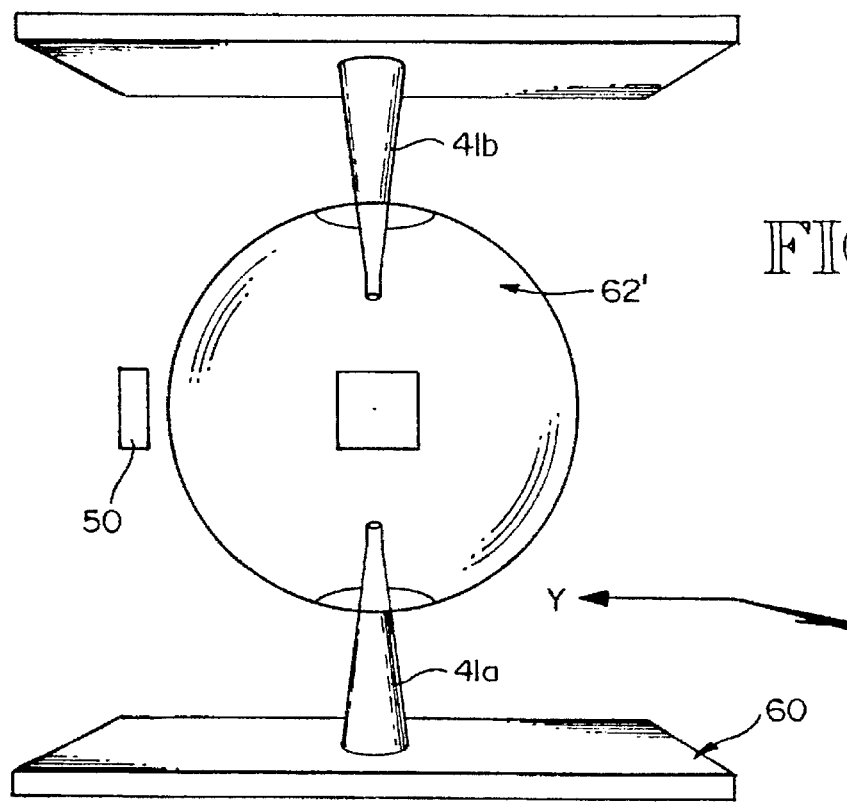
FIG. 15b is an alternative embodiment to that shown in FIG. 15a wherein a tang wholly supports the mass.

Alternatively, and as shown in FIG. 15b, mass 62' can be entirely supported by tang 41a and located thereon by coaxially aligned tang 41b. In this manner, friction or stiction forces are localized and minimized. As with previous embodiments utilizing tangs for elastic members, the corresponding bores are slightly oversized to avoid binding.

Figure 16A:
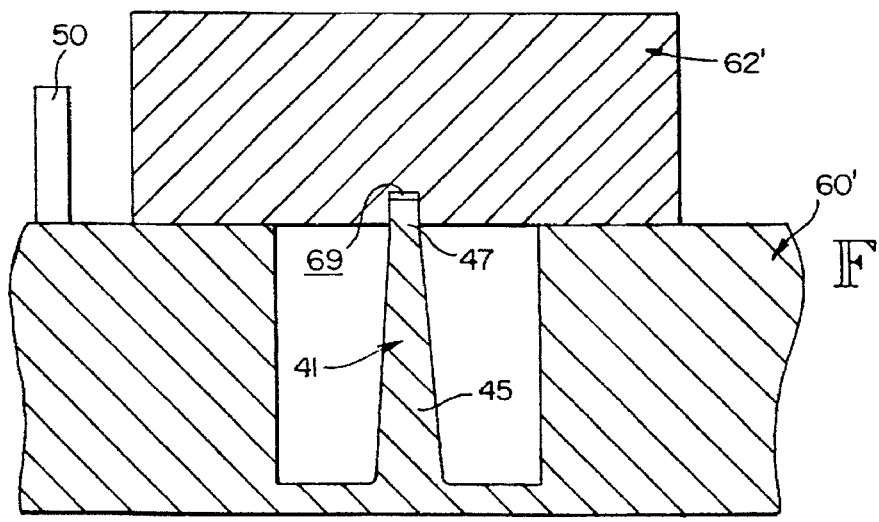
FIG. 16a shows an alternative tang and mass configuration to that shown in FIG. 15a wherein the tang engages the mass from the supporting surface.
Figure 16B:
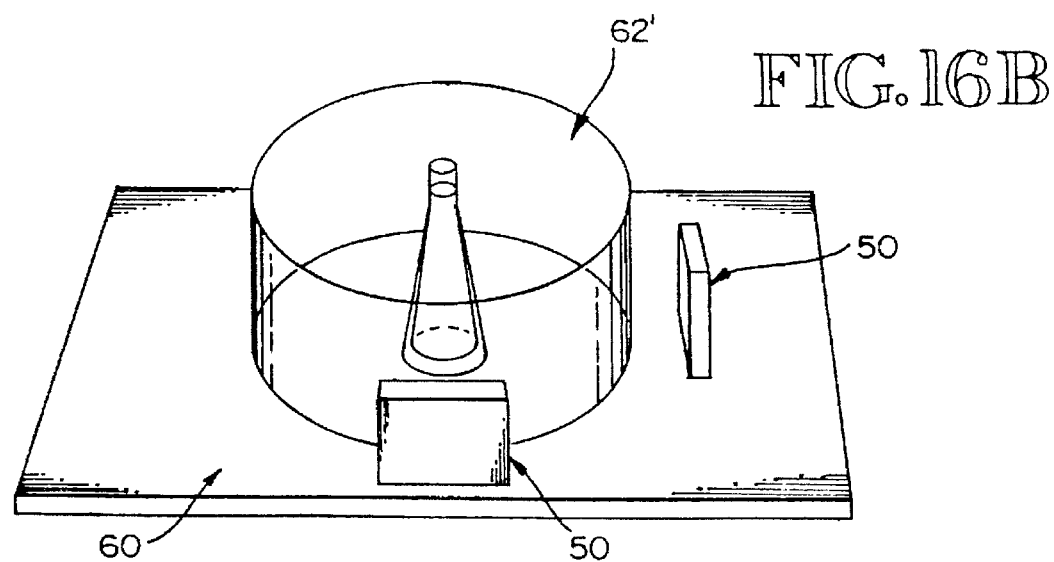
FIG. 16b is an alternative embodiment to that shown in FIG. 16a wherein the tang is located on the surface of the supporting surface with the tang/mass interaction shown for illustrative purpose.

It is not necessary to form tang 41 as part of housing cover 22 as is shown in FIG. 16a wherein supporting surface 60' has been modified to provide for tang 41. In FIG. 16b, supporting surface 60 is utilized but the tang is located thereon instead of recess as was shown in FIG. 16a. In this embodiment, it is desirable to slightly "float" the mass by about 0.001 inch to again reduce friction effects between the mass and the supporting surface.

Figure 17:
FIG. 17 is a perspective view of an alternative tang design intended to physically prevent movement of the mass, when engaged therewith, in one direction.

If accelerations in only one direction are desired to be measured, the tang can be formed so as to be asymmetrical as is shown in FIG. 17. Here, tang 41' has a rectangular cross section which permits it to flex in the minor axis direction but remains essentially rigid in the major axis direction. In this manner, there is no need for separate off-axis prevention means since the mass is not responsive to accelerations in the major axis.

Modifications

Figure 10:
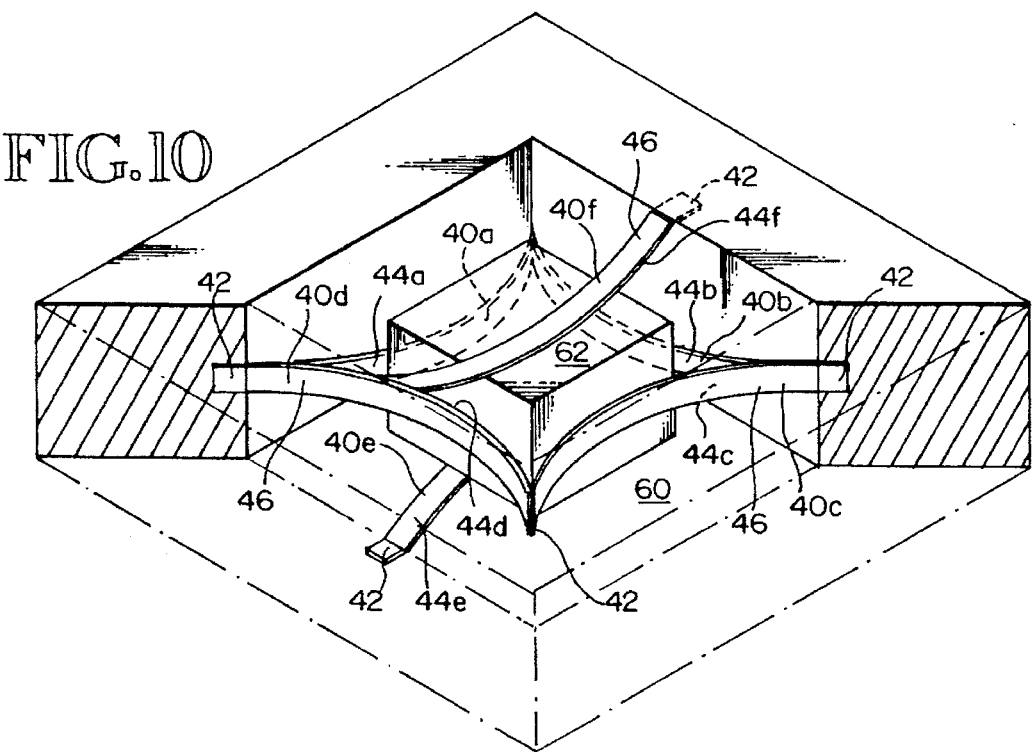
FIG. 10 is a simplified perspective view, in partial cutaway, of a three axis embodiment of the invention wherein the mass is entirely supported by elastic members.

The leaf spring embodiment is capable of being modified into a three axis accelerometer by replacing surface 60 with an additional centrally located spring 40e and adding a sixth spring 40f so as to be in compressive tangential contact with mass 62 as is shown in FIG. 10. In this embodiment, mass 62 is entirely supported at all axes by members 40. To reduce friction problems, either a low friction coating such as Teflon® can be applied to the surfaces of mass 62 and to inboard surfaces 44a–f of springs 40a–f, and/or the entire assembly. Alternatively, the entire assembly can be encapsulated in a light, substantially transparent oil.

Figure 19A:
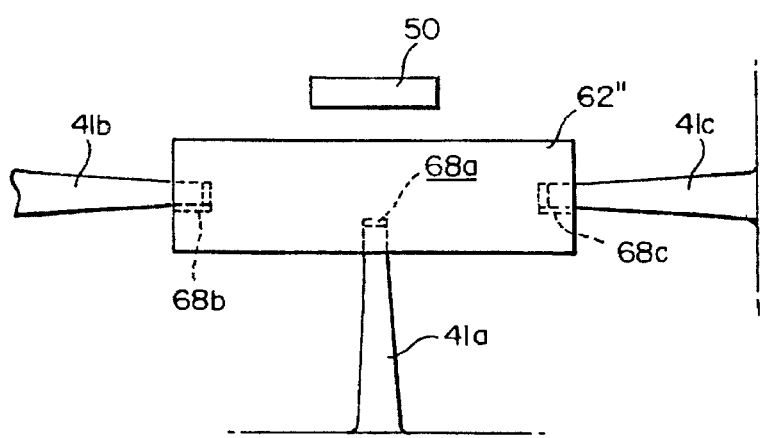
FIG. 19a is an elevation view of a three axis embodiment utilizing tang type elastic member.
Figure 19B:
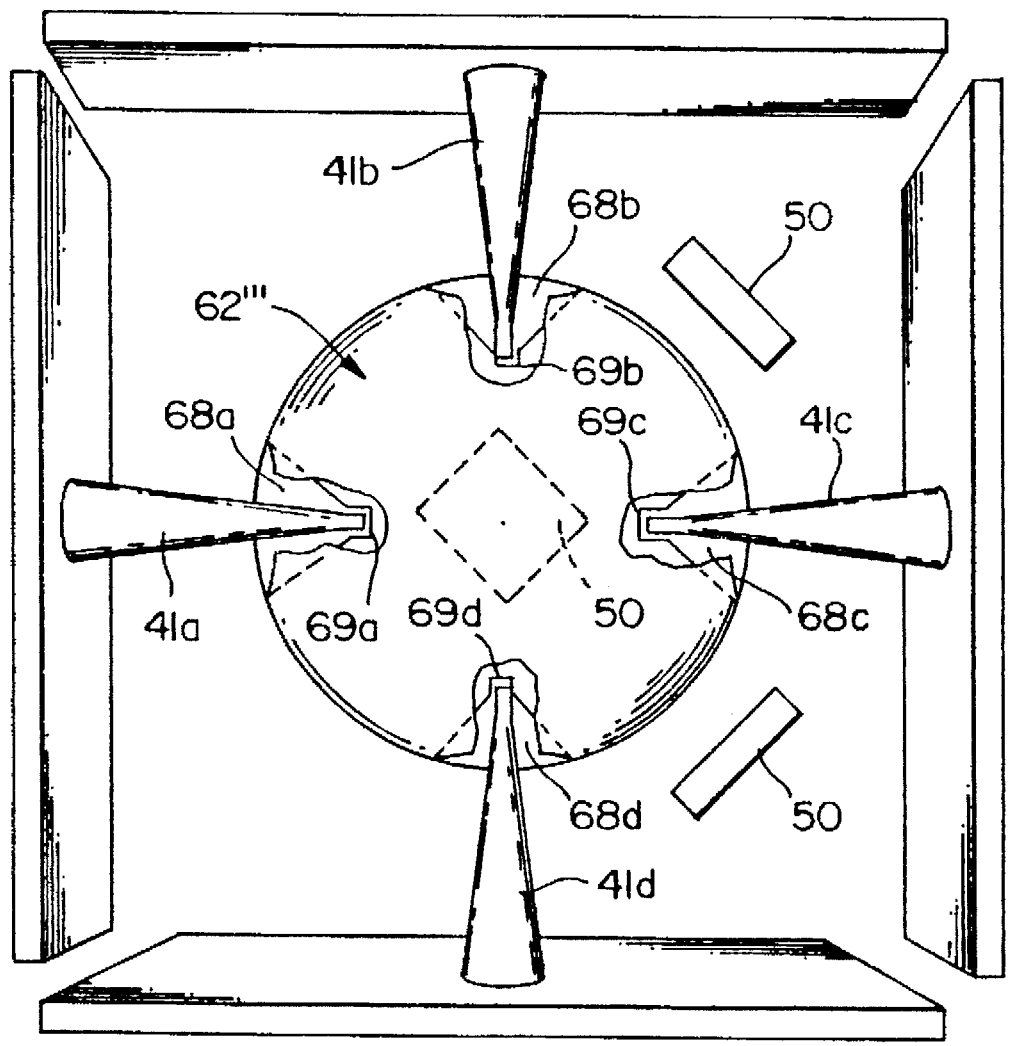
FIG. 19b is a plan view of an alternative embodiment to that shown in FIG. 19a wherein all tangs are substantially co-planar.

The tang spring embodiment can similarly be modified into a three axis accelerometer as is shown in FIGS. 19a and 19b. Turning first to FIG. 19a, it is desirable to make bore 68a deeper than bore 68 of the two axis embodiment so as to permit axial movement of mass 62"; and to form bores 68b and 68c into deep slots so as to permit substantially unrestricted lateral motion of mass 62". In this manner, lateral resistance or bias is only provided by tang 41a, and vertical resistance or bias is only provided by tangs 41b and 41c. Because both tangs 41b and 41c resist movement of mass 62" in a direction parallel to the axis of tang 41a, the resistance provided by these tangs is approximately twice that of the resistance provided by tang 41a when subjected to lateral acceleration forces.

In the embodiment of FIG. 19b, each bore 68 is preferable conical while each bore 69 remains cylindrical as previously described. As with the embodiment shown in FIG. 19a, bores 69 depend into mass 62'" a sufficient depth beyond the corresponding length of each tang 41 so as to permit sufficient lateral movement when the mass encounters acceleration force components in a planar direction coincident to the tang's axis. It is not necessary to form bores 68 into slots. It is also noted that resistance to accelerations normal to the plane defined by the tangs is approximately twice as great as the resistance to planar acceleration forces.

Applications

The present invention can be applied to a wide variety of applications. A preferred use for the invention is as a driver performance monitor. In this use, the unit is positioned substantially level in a vehicle and switched to the on state. As described above in reference to the processor logic operations of FIGS. 7, 8, and 9, the peak accelerations in the x and y axes will be stored and displayed. After switching the unit on, the display will show two closely spaced zeros. Pressing reset switch 26 will cause display unit 30 to show, for approximately 3 seconds, the number of times that the unit has been reset. By tracking the number of resets, a person can more easily determine if the unit has been intentionally reset so as to erase potentially critical driving record information.

After approximately 3 seconds has elapsed, display 30 will show either the first seven cornering events having a magnitude above a preset value, or all zeros if the unit has been reset. Pressing switch 26 again causes display unit 30 to show the first seven start/stop events having a magnitude above a preset value, or all zeros if the unit has been reset. By once again momentarily depressing switch 26, the internally stored driving record data is removed from memory 34 as confirmed by display unit 30 showing two sets of two zeros. The unit is now set in the measurement mode. Significant accelerations and decelerations will be displayed, with the first seven significant events for x axis and y axis being stored in memory.

An optional keypad entry device may be added to the unit to permit multiple driver monitoring for any given vehicle. Additional modifications include linking the unit to a transmitter so that acceleration data processed by the unit could be periodically relayed to a remote location.

The described driving monitor is believed to be useful by common carriers or fleet operators to monitor the performance of their drivers, or by parents when "loaning" their automobile to their dependents. Insurance companies may also be interested in such a device.

A variant of the performance monitor includes an expanded memory unit to continuously track accelerations for a given period of time on a first in, first out basis regardless of vehicle accelerations. In this manner, a continuously updated profile of vehicle acceleration is maintained until acceleration forces equivalent to those encountered in an accident or impact are encountered, at which time no new accelerations are added to memory. The length of the profile period is a function of the sampling rate and the size of memory. The raw data stored in the memory can be retrieved via a communication port associated with the processor and interpreted via appropriate software into a usable form such as by graph.

Figure 11:
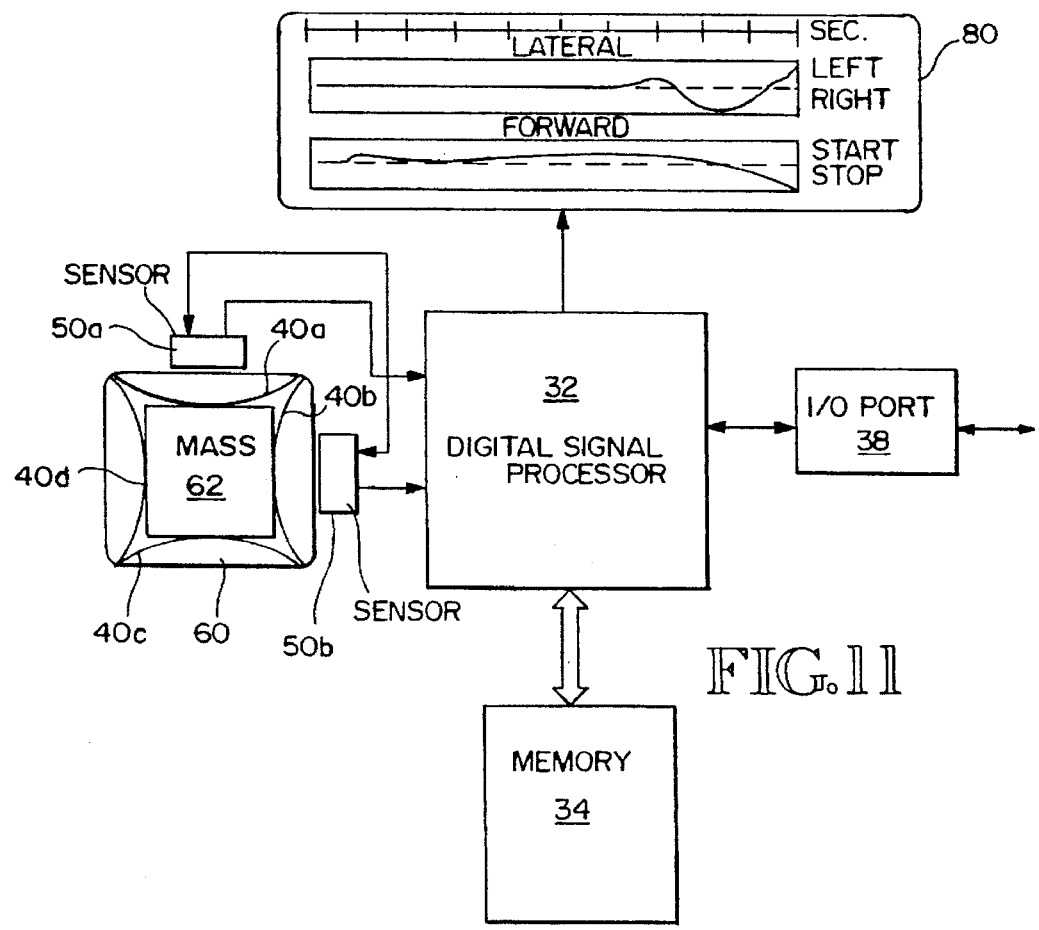
FIG. 11 shows the essential components of the invention when used as a pre-impact monitor.

To illustrate this pre-impact application, FIG. 11 shows a collected data profile of a vehicle initially traveling straight forward. The vehicle then begins to make a right turn and quickly is turned left at the same time a sudden deceleration is recorded. The sudden change or impact in lateral direction or deceleration triggers the processor to stop recording new data so that a snapshot of the acceleration profile of the vehicle just prior to the impact is recorded into the memory. Subsequent analysis of the profile data could assist in determining the events leading to the impact, corroborate or contradict eye-witness testimony, and assist in establishing liability.

Figure 12:
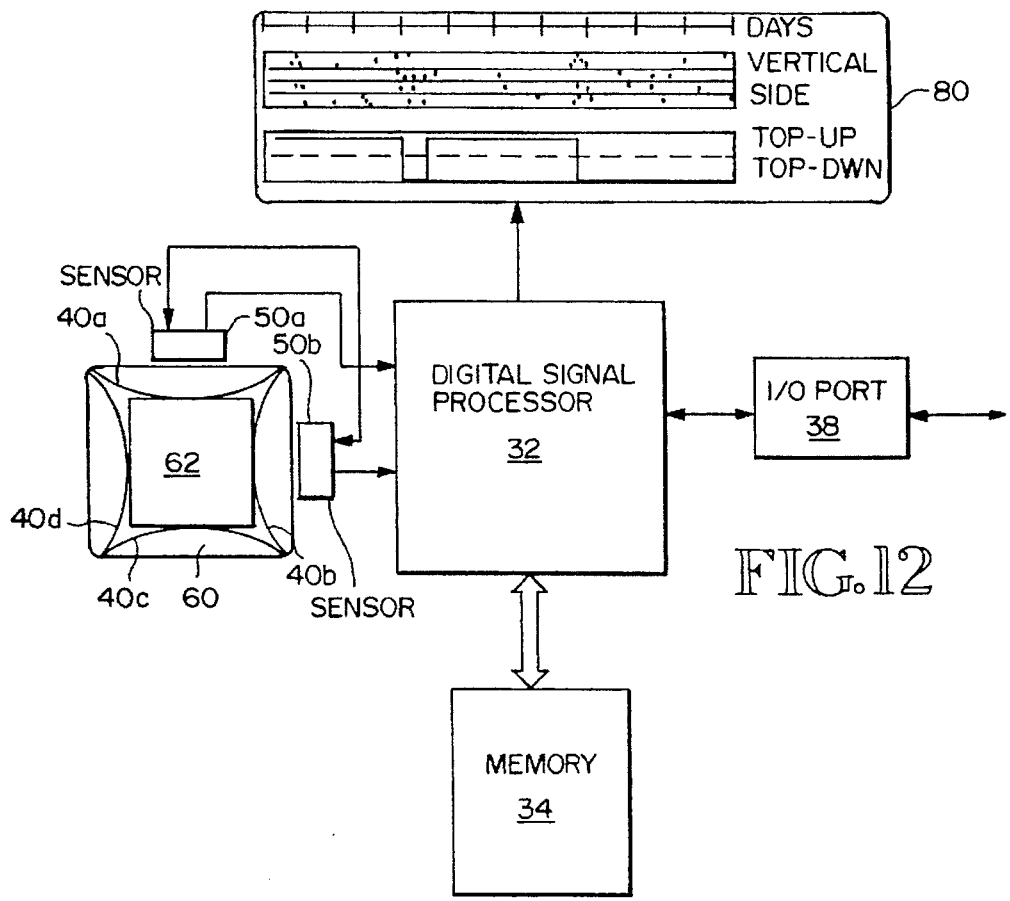
FIG. 12 shows the essential components of the invention when used as a shipping monitor.

A similar scheme can be employed to obtain an acceleration profile of an item being transported from one location to another. Unlike the impact monitor described above, the profile is historical from the moment it is initiated until the moment it is concluded. In operation, the unit is mounted to an object being shipped and any acceleration force encountered by the unit is time-tagged and stored into memory. After shipping, the memory of the unit is downloaded and graphically interpreted as best shown in FIG. 12. In this figure, the frequency and magnitude of lateral and vertical accelerations are monitored and logged to provide a shipping profile.

Figure 13:
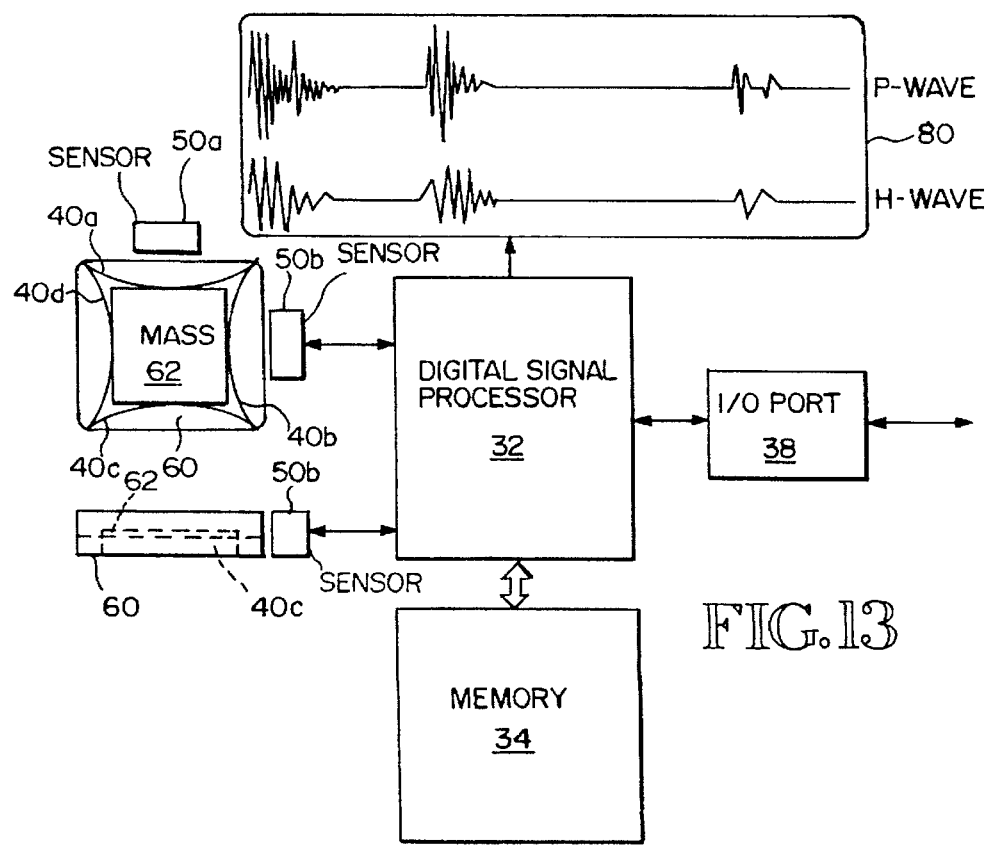
FIG. 13 shows the essential components of the invention when used as a seismic activities monitor.

The above-described units, either as is or in slightly modified form, may also be used in a variety of different applications. A unit may be placed in a water-borne vessel to monitor and record pitch, roll, and heave data. Similarly, the device can be modified to provide tilt information important in such industries as vessel stability and load calculations and geophysical monitors. The spring constant of the springs may be altered to provide an extremely sensitive amateur seismometer for monitoring P and H waves as shown in FIG. 13. The same instrument may also be used for monitoring physical structure vibration such as might be encountered in bridges, tall buildings, or other wind or earthquake sensitive structures. Similarly, an analogous device can be attached to a machine housing or component thereof to determine the frequency and magnitude of vibrations.

The ability of the unit as shown in FIGS. 11, 12, and 13 to download acceleration information also permits it to operate slave devices in response to encountered accelerations. For example, by linking one or more remote-activated valves, accelerations encountered when monitoring physical phenomena could trigger a gas, water, or fuel line to close. Similar applications include linking a shut-off relay to the invention to stop a machine when excessive vibration is detected.

Industrial Applicability

The present invention will find use in any application wherein it is desired to monitor the acceleration forces encountered by the invention.

What is claimed is:

1. A same frame of reference accelerometer comprising:
   a mass;
   a rigid member;
   a first elastic member linked to the mass at a first location, and attached to the rigid member at a second location wherein the first elastic member depends into a bore defined by the mass and whereby movement of the mass causes resisted deflection of the first elastic member;
   a first proximity sensor located proximate to the mass whereby the first proximity sensor provides information relating to the distance between the mass and the first proximity sensor.

2. The accelerometer of claim 1 wherein the rigid member is a housing and the first elastic member generally supports the mass.

3. The accelerometer of claim 1 wherein the rigid member is a supporting surface defining a plane generally coincident to acceleration forces to be measured and the first elastic member links the supporting surface to the mass.

4. The accelerometer of claim 1 wherein the elastic member is a tang.

5. The accelerometer of claim 1 wherein the elastic member is asymmetrical whereby at least one acceleration force vector presented to the mass is physically masked.

6. The accelerometer of claim 1 further comprising:
   a signal processor operatively coupled to the first proximity sensor to receive the information provided therefrom and generate a plurality of time based acceleration values, at least a portion of which are addressable to a memory;
   a memory operatively coupled to the signal processor for discretely storing at least a portion of the plurality of time based acceleration values; and
   an output operatively coupled to the signal processor for presenting at least one of the plurality of time based acceleration values stored in the memory.

7. The accelerometer of claim 6 further comprising a second proximity sensor located proximate to the mass whereby the second proximity sensor provides information relating to the distance between the mass and the second proximity sensor.

8. The accelerometer of claim 7 wherein the first proximity sensor is located in a plane that is substantially perpendicular to a plane in which the second proximity sensor is located.

9. A same frame of reference accelerometer comprising:
   a housing having a first surface and a second surface wherein the first surface and the second surface are in generally opposing relationship;
   a mass disposed generally intermediate the first surface and the second surface;
   a first elastic member linked to the mass at a first location and attached to the first surface at a second location wherein the first elastic member depends into a bore defined by the mass, and a second elastic member linked to the mass at a first location and attached to the second surface at a second location wherein the second elastic member depends into a bore defined by the mass and wherein the first elastic member and second elastic member are in general opposition to one another and generally define an axis therebetween, whereby movement of the mass in a direction substantially normal to the axis causes resisted deflection of the first elastic member and the second elastic member; and a first proximity sensor located proximate to the mass whereby the first proximity sensor provides information relating to the distance between the mass and the first proximity sensor.

10. The accelerometer of claim 9 wherein the axis is substantially normal to gravitational acceleration.

11. The accelerometer of claim 9 wherein the axis is substantially coincident with gravitational acceleration.

12. The accelerometer of claim 9 further comprising a second proximity sensor located proximate to the mass whereby the second proximity sensor provides information relating to the distance between the mass and the second proximity sensor.

13. The accelerometer of claim 9 further comprising:

a signal processor operatively coupled to the first proximity sensor to receive the information provided therefrom and generate a plurality of time based acceleration values, at least a portion of which are addressable to a memory;

a memory operatively coupled to the signal processor for discretely storing at least a portion of the plurality of time based acceleration values; and an output operatively coupled to the signal processor for presenting at least one of the plurality of time based acceleration values stored in the memory.

14. The accelerometer of claim 13 further comprising a second proximity sensor located proximate to the mass whereby the second proximity sensor provides information relating to the distance between the mass and the second proximity sensor.

15. The accelerometer of claim 14 wherein the first proximity sensor is located in a plane that is substantially perpendicular to a plane in which the second proximity sensor is located.

16. The accelerometer of claim 15 further comprising:

a signal processor operatively coupled to the first proximity sensor and the second proximity sensor to receive the information provided therefrom and generate a plurality of time based acceleration values, at least a portion of which are addressable to a memory;

a memory operatively coupled to the signal processor for discretely storing at least a portion of the plurality of time based acceleration values; and an output operatively coupled to the signal processor for presenting at least one of the plurality of time based acceleration values stored in the memory.

17. A same frame of reference accelerometer comprising:

a mass;

a first elastic member linked to the mass as a first location, and attached to a rigid member at a second location wherein the first elastic member depends into a bore defined by the mass and whereby movement of the mass causes resisted deflection of the first elastic member;

a first proximity sensor located proximate to the mass whereby the first proximity sensor provides information relating to the distance between the mass and the first proximity sensor; and a second proximity sensor located proximate to the mass whereby the second proximity sensor provides information relating to the distance between the mass and the second proximity sensor.

18. The accelerometer of claim 17 further comprising:

a signal processor operatively coupled to the first proximity sensor and the second proximity sensor to receive the information provided therefrom and generate a plurality of time based acceleration values, at least a portion of which are addressable to a memory;

a memory operatively coupled to the signal processor for discretely storing at least a portion of the plurality of time based acceleration values; and an output operatively coupled to the signal processor for presenting at least one of the plurality of time based acceleration values stored in the memory.

19. A same frame of reference accelerometer comprising:

a housing having a first surface and a second surface wherein the first surface and the second surface are in generally opposing relationship, and a third surface generally orthogonal to the first surface and the second surface;

a mass disposed generally equidistant the first surface, the second surface, and the third surface;

a first elastic member linked to the mass at a first location and attached to the first surface at a second location wherein the first elastic member depends into a bore defined by the mass, a second elastic member linked to the mass at a first location and attached to the second surface at a second location wherein the second elastic member depends into a bore defined by the mass, and a third elastic member linked to the mass at a first location and attached to the third surface at a second location wherein the third elastic member depends into a bore defined by the mass, and wherein the first elastic member and second elastic member are in generally opposition to one another and generally lie on a common plane and wherein the third elastic member is oriented generally normal to the common plane and whereby movement of the mass in any direction causes resisted deflection of at least one elastic member;

a first proximity sensor located proximate to the mass whereby the first proximity sensor provides information relating to the distance between the mass and the first proximity sensor;

a second proximity sensor located proximate to the mass whereby the second proximity sensor provides information relating to the distance between the mass and the second proximity sensor; and a third proximity sensor located proximate to the mass whereby the third proximity sensor provides information relating to the distance between the mass and the third proximity sensor.

20. The accelerometer of claim 19 further comprising:

a signal processor operatively coupled to the first proximity sensor, the second proximity sensor, and the third proximity to receive the information provided therefrom and generate a plurality of time based acceleration values, at least a portion of which are addressable to a memory;

a memory operatively coupled to the signal processor for discretely storing at least a portion of the plurality of time based acceleration values; and an output operatively coupled to the signal processor for presenting at least one of the plurality of time based acceleration values stored in the memory.

* * * * *